No. 879,468. PATENTED FEB. 18, 1908.
A. H. ILLINGWORTH.
BAIT CASTING REEL USED IN ANGLING.
APPLICATION FILED MAY 4, 1906.

WITNESSES
W. P. Burke
W. J. Donovan

INVENTOR
Alfred Holden Illingworth
BY Richardson
ATTYS

UNITED STATES PATENT OFFICE.

ALFRED HOLDEN ILLINGWORTH, OF BEN RHYDDING, ENGLAND.

BAIT-CASTING REEL USED IN ANGLING.

No. 879,468.

Specification of Letters Patent.

Patented Feb. 18, 1908.

Application filed May 4, 1906. Serial No. 315,221.

*To all whom it may concern:*

Be it known that I, ALFRED HOLDEN ILLINGWORTH, a subject of the King of Great Britain and Ireland, whose postal address is 2, Highclere Villas, Ben Rhydding, in the county of York, England, have invented certain new and useful Improvements in and Relating to Bait-Casting Reels Used in Angling, of which the following is a specification.

This invention relates to improvements in what are known as "bait casting reels," used in angling, and has for its object, the construction of a reel in such a manner that the axis of the spool or drum on which the line is wound always remains parallel to the rod to which the reel is attached, the said spool or drum remaining stationary either when "casting," or recovering the line in the operation of angling.

By the use of a reel constructed in accordance with my invention, better "casts" may be made owing to the decrease in friction hitherto experienced, and the line may be wound evenly on the spool or drum.

Figure 1:
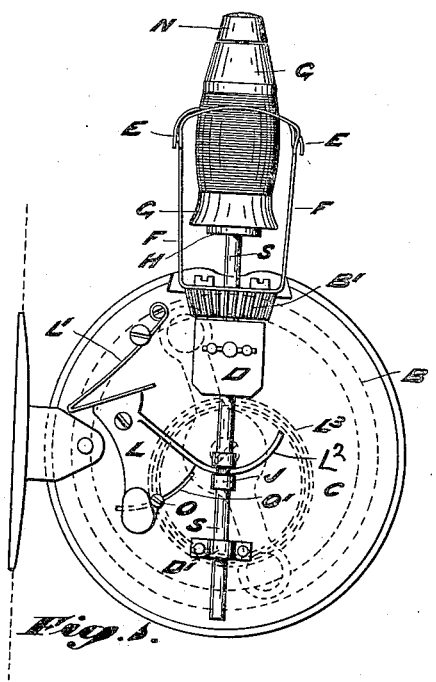
Figure 2:
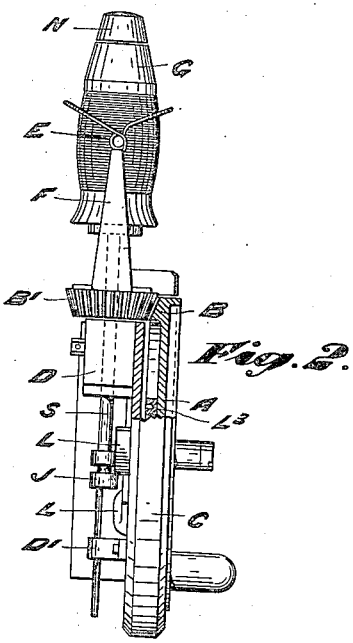
Figures 3, 4:
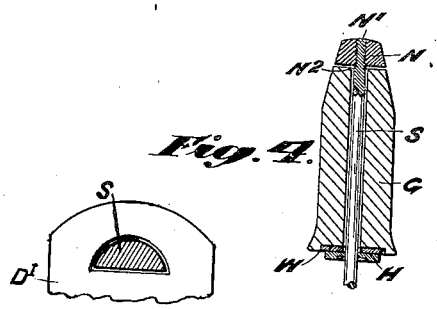
Figure 7:
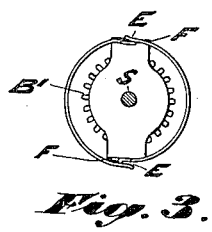
Figure 5:
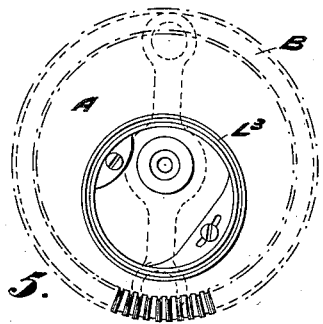
Figure 6:
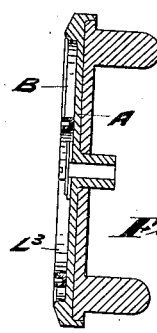

In describing my invention in detail, reference is made to the accompanying sheet of drawings, similar letters indicating similar parts, in which, Figure 1 represents a back view of a reel showing one form of arrangement of my improvement. Fig. 2 represents a side view, partly in section. Fig. 3 represents a plan view of the flier hereinafter referred to.
Fig. 4 represents a sectional elevation of the spool and spindle. Fig. 5 represents a face view of the operating wheel and cam, and, Fig. 6 is a section through the same. Fig. 7 is a section showing the spindle and one of its bearings.

In carrying out my invention, the revolving disk A of the reel is provided, on or towards its outer edge, with by preference, bevel teeth B, thus forming a toothed wheel, such toothed wheel in the form herein shown is retained in a suitable casing C. The teeth B engage the teeth of a bevel toothed wheel $B^1$ which is revolubly mounted around a spindle S of suitable length, such spindle being mounted and free to slide but not revolve in suitable bearings D and $D^1$ which are attached to the casing C. The said spindle is parallel to the rod and one end of the same projects towards the point of the rod.

Attached to or forming part of the bevel toothed wheel $B^1$ is a form of what is known to the textile trade as a "flier" F, provided with one or more false eyes E. On the revolving disk A being operated by the angler, the bevel wheel $B^1$ and "flier" F will revolve around the spindle.

The spool or drum G, which may take various forms, and around which the line is wound, is mounted on or towards the projecting end of the spindle S in such a manner that the same may be retained securely thereon, and at the same time be removed therefrom when desired, but should a certain strain be placed on the line by reason of a fish being hooked or the hook being held by weed or other matter, then the said spool or drum may revolve. The spindle S, a suitable distance from the projecting end, has mounted or formed thereon a flange H, and the projecting end of the spindle threaded at $N^1$ for the reception of a nut or the like N, a shoulder $N^2$ being formed on the spindle against which the nut when screwed home will engage. The spool or drum G is placed on the spindle against the flange H, and compressible washer, W, and the nut N screwed home, the spool being held between the nut N and flange H, and washer W thereon. Should the spool require to be fixed firmer between the flange and nut, one or more other compressible washers such as W may be added to the one already in position around the spindle, and abut against the flange H, and the nut N screwed home. Thus the ease with which the revolution of the spool will take place may be regulated, though other devices for accomplishing this purpose may be resorted to without in any way departing from the principle of my improvement.

In order that the line may be evenly wound on the spool or drum, the line is passed through one of the false eyes E of the "flier" F, and the spindle S is given a sliding motion similar to what is known in textile industries as a "lifter motion." This motion may be imparted by the angler by means of a cam, lever, or the like. To impart this motion by the rotation of the disk A, I arrange eccentrically on said disk a cam $L^3$, which rotates with the disk and on the casing C is pivoted a thumb lever L having a portion $L^2$ engaging in a bearing J on the spindle S formed by bosses thereon. A spring $L'$ also secured to the casing and engaging with the lever L serves to hold the lever and therefore the spindles in their rearmost positions. A curved slot O' is formed in the casing and through this slot a pin O secured to the lever L extends, said pin engaging with the cam L³. Thus it will be seen that as the disk A is rotated the cam L³ will draw the lever L upwardly by means of the pin O and thus raise the spindle, the spring L' returning the parts to normal position as soon as the cam L³ will permit. If the angler wishes to reciprocate the spindle without rotating it, he presses the lever L upwardly and then permits the spring L' to return it to normal position.

In operation, when "casting" or "recovering" the line, the spool or drum G remains stationary. When "casting" the line, which is not passed through one of the "flier" eyes E, slips off the end of the spool. In "recovering" the line is passed into a false eye E of the "flier" F, and the "flier" revolved as before described. The spindle S together with the spool is given a backward and forward movement, within the "flier" by means of the "lifter motion," thereby winding the line evenly over the spool, or a portion of the same. When a fish is hooked, or strain applied to the line, the spool will revolve, and allow the line to run out. The line, it will be understood, is immediately after a cast slipped into one of the false eyes of the "flier", the form of "flier" shown in the drawings assisting such operation.

What I claim as my invention is:—

1. In a device of the class described the combination, of a sliding but non-revoluble spindle, a spool mounted thereon, a winding device on the spindle having an eye, a disk and means for operating the winding device by the turning movement of the disk.

2. In a device of the class described, the combination with a sliding non-revoluble spindle, a spool mounted thereon and a thumb lever having an arm engaging with the spindle so as to give the spindle a reciprocating motion.

3. In a device of the class described, the combination with a sliding non-revoluble spindle, a spool mounted thereon, a disk, a cam L³ having a recess, mounted on the disk, a lever having an arm engaging with the spindle and a pin on the lever engaging with the recess in the cam.

4. A reel comprising a revolving disk having beveled teeth thereon, a non-revoluble but sliding spindle, a spool mounted thereon, a flier revolving around said spool, a wheel revolubly mounted on said spindle and carrying said flier, said wheel having bevel teeth meshing with the teeth of the disk and means for giving said spindle a reciprocating motion, said means consisting of a lever L and an eccentric connected to the disk.

5. A bait casting reel comprising a non-revoluble reciprocating spindle having a flange H thereon, a nut N on said spindle and a spool on the spindle between the flange and nut.

6. The combination with a revolving toothed disk A, a non-revoluble reciprocating spindle, a toothed wheel thereon engaging with the disk A, arms on said wheel, a flier on said arms, a spool on said spindle, a tension regulating means for said spool, a cam revolving with the disk, a lever L connected to the spindle and a pin connecting the lever with the cam.

7. A reel comprising a toothed disk A, a cam connected to said disk, a spindle, a lever L, connected to the spindle, a connection between the lever and cam for oscillating the lever on the rotation of the cam for giving the spindle a reciprocating motion, a spool carried by the spindle, a flier surrounding the spool and means for rotating the flier by the disk A.

In witness whereof I have hereunto set my hand in the presence of two witnesses.

ALBERT HOLDEN ILLINGWORTH.

Witnesses:
FORSTER HARD,
PETER W. HOLDEN.